United States Patent Office 3,207,898
Patented Sept. 21, 1965

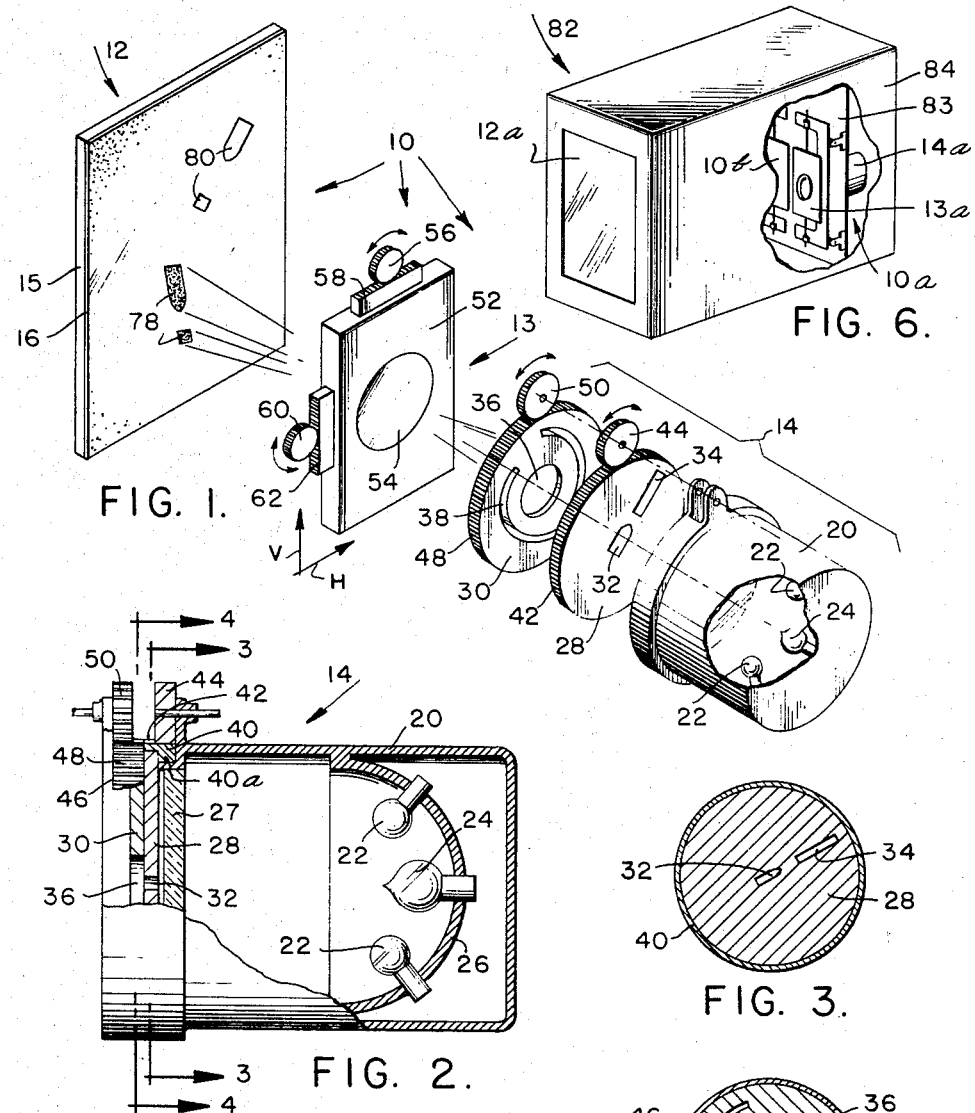

3,207,898
OPTICAL PROJECTOR FOR USE WITH A PHOSPHORESCENT SCREEN
Clarence R. Linsley, La Crescenta, Calif., assignor, by mesne assignments, to the United States of America as represented by the Secretary of the Navy
Filed July 9, 1963, Ser. No. 293,917
7 Claims. (Cl. 250—71)

This invention relates to optical projection or "printing" of a moving image upon a phosphorescent screen, such as is done in representing movements of ship, aircraft or other moving objects. More particularly the improvement of the invention relates to projection apparatus which is additionally capable of projecting a stationary persistent image of the object to mark the position of the object at a particular moment of time. The invention also relates, generally, to the projection of a persistent image upon a phosphorescent screen.

In connection with plotting movements of objects, it is sometimes desirable to mark a particular position of the object at a discrete moment of time. An example is in plotting the position and predicted position of the target during a RAT missile attack upon a submarine, as disclosed in U.S. Patent 3,088,403. The RAT missile propels a torpedo along a fixed airborne trajectory to a position near the submarine, and this trajectory is tracked by radar and displayed on the plotting screen along with moving images of the position, and a predicted position of the target. In addition to keeping a continuous moving plot of the target, it is desirable to mark its position and its predicted position, at the moment the missile is fired. By later comparing these positions with the "splash point" at which the torpedo enters the water, a visual determination of any corrections in the next round to be fired, may be made.

Although it was known for some time that long persistent optical markings could be projected onto phosphorescent screens, such markings have not been used, to any appreciable scope, as a means of marking the momentary position of a moving image. Instead, manual marking by means of a crayon of fluorescent material has, prior to the present invention, been generally resorted to.

To a large extent, the reluctance to employ marking by a persistent image stems from difficulties inherent to the equipment available for producing a long persistence image. The principal prior art approach was to employ a fast acting shutter between a continuously illuminated zirconium arc lamp and the screen. This type of lamp produces a point source of light and therefore requires very accurate mounting of the light source in the image plane of the projector lens. Moreover, precise focusing of this point source requires a separate projector lens for each moving image and a separate lens for each persistant image.

Also, unless elaborate optical accessories are employed, the zirconium arc lamp is generally limited to projection of a circular spot, and it is somewhat unsatisfactory for plotting two or more persistent images. In the latter cases, it was more convenient to employ the fluorescent crayon, and manually mark positions of different images using distinctive patterns such as an "O" or "X."

Accordingly, the objectives of the present invention include provision of:

(1) An improved optical projector for use with a phosphorescent screen capable of selectively representing an object by both a persistent and a non-persistent image.

(2) An optical projector in accordance with the previous objective which employs a single projector lens for projecting both the persistent and non-persistent images.

(3) An optical projector for projecting a persistent image on a phosphorescent screen which employs a single lamp unit to project more than one image.

(4) An optical projector for projecting a persistent image on a phosphorescent screen in which the mounting position of the lamp is not critical.

(5) An improved optical projector for projecting a persistent image on a phosphorescent screen which is capable of projecting an image having a distinctive pattern.

Other objects and many of the attendant advantages of this invention will be readily appreciated as the same becomes better understood by reference to the following detailed description when considered in connection with the accompanying drawings wherein:

FIG. 1 is a diagrammatic exploded view of an optical projector and a phosphorescent screen;
FIG. 2 is a longitudinal section of the lamp and diaphragm assembly of FIG. 1;
FIG. 3 is a section taken along line 3—3, FIG. 2;
FIG. 4 is a section taken along line 4—4, FIG. 2;
FIG. 5 is an electrical schematic of a power supply for the lamps; and
FIG. 6 is a multi-channel plotter in which the device of FIG. 1 may be employed.

Referring now to the drawing and in particular to FIG. 1, plotting apparatus 10 generally comprises a viewing screen 12, a lens table 13, and a lamp and diaphragm unit 14. Viewing screen 12 comprises plate glass 15 having a front viewing face and a rear face which is coated with a layer of phosphorescent material 16. When invisible ultra-violet light, or visible light in the portion of the radiant energy spectrum near ultra-violet, energizes or strikes layer 16, the area which is so energized emits visible light which persists for an interval of time proportional to the intensity of the incident radiant energy.

Lamp and diaphragm assembly 14 comprises a tubular housing 20 having disposed at its rear end one or more continously energized conventional incandescent lamps 22, and also a selectively impulsed xenon flash lamp 24. Lamps 22 provide a source of homogeneously scattered illumination, and in this respect are to be distinguished from other types of incandescent projector lamps that have specialized filament structures to produce a point source of light. Xenon flash lamp 24 consists of an envelope, FIG. 5, containing spaced electrodes and filled with a gaseous medium including gaseous xenon. When an impulse of sufficiently high voltage is applied across the electrodes, the gaseous medium ionizes under the electric field generated between the electrodes, and a brilliant flash of illumination is emitted. This flash of illumination is also of the homogeneously scattered type. Although both incandescent lamps 22 and flash lamp 24 are manufactured primarily as sources of visible light, it has been found that the spectral characteristics of the radiant energy which they emit provides sufficient energy of the phosphorescence producing type for purposes of projecting the desired images unto phosphorescent screen 12. A suitable reflector 26, FIG. 2, is optionally provided to direct light in the direction of projection. Reflector 26 does not focus or collimate the light, but merely serves to concentrate its projection in the forward direction. A filter 27 having the quality of rejecting un-needed portions of the spectrum of radiant energy, is optionally provided ahead of the lamps.

A pair of thin, adjacently disposed, stop diaphragms 28 and 30 are disposed across the projection end of tubular housing 26. Formed in diaphragm 28 a centrally located aperture 32 shaped in the form of a ship-like pattern, and also a long, narrow, slit 34 spaced apart from and extending from the bow of the ship. Formed in stop diaphragm 30 is a central circular aperture 36 and a spiral split 38.

Although illustrated in exaggerated scale, the apertures are formed by relatively small openings. In a typical application the width of the ship-shaped aperture 32 or slit 34 may be in the order of .010 to .020 inch.

As best shown in FIG. 2, stop diaphragm 28 is mounted for rotation about the housing axis by means of a rim 40 provided around its outer periphery. The rim has an annular portion 40a projecting from the rear face of the diaphragm, which is engaged by axial and radial bearing surfaces formed on tubular housing 20. Gear teeth 42 are formed on the outer periphery of rim 40 and are engaged by a ship's course change pinion 44, which extends through a suitable opening in the housing. Ship's course change pinion 44 is driven in rotation in a conventional manner by fire control apparatus or other means not forming a part of the invention. In similar manner diaphragm 30 has a rim 46 and peripheral teeth 48 which are engaged by a ship's speed change pinion 50.

Lens table 13 contains a projection and image positioning lens 54. Lens table 13 is supported in any suitable manner (not shown) for rectilinearly movement in each of the transverse directions of arrows H and V within a plane parallel to the plane of the screen 12. The position of lens table 13 may be selectively varied in the H direction by a horizontal position change pinion 56 engaging a rack 58 and similarly its position in the V direction may be varied by pinion 60 and rack 62. Pinions 56 and 60 are also conventionally driven.

Referring now to FIG. 5, an exemplary circuit for energizing lamps 22 and lamp 24 comprise a transformer 64 having its primary winding connected to a conventional A.C. source. A.C. current is provided for incandescent lamps 22 by a step-down secondary winding 66, across which the lamps are parallel connected through a series connected adjustable tap resistor 68 for adjusting the color at which the lamp filaments burn. To provide a source of current for impulsing xenon lamp 24, the current from a secondary winding 70 is rectified and doubled by a conventional circuit 72 and applied as charge to a storage capacitor 74. The electrodes of lamp 24 are series connected to storage capacitor 74 through a suitable keying arrangement 76.

In projecting the image on screen 12, lamps 22 continuously illuminate the rear face of diaphragm 28, and since lamps 22 emit scattered light the illumination of diaphragm 28 is even. Diaphragms 28 and 30 intercept the projection of this illumination and pass light only where the apertures of each diaphragm are superimposed. Since the diaphragms are thin, and the light is scattered, the apertures form an image of light having the same shape as the pattern formed by the superimposed diaphragm apertures, as viewed from ahead of the diaphragms. Superimposed apertures 32 and 36 form a ship-like image of light with the bow of the ship-like image pointed in a direction determined by the angular position of pinion 44. Straight slit 34 and spiral slit 38 form an image shaped as a square spot representing a predicted future position of the ship radially spaced from the bow of the ship-like image by a distance determined by the angular position of pinion 50. Since diaphragms 28 and 30 are thin, the light image formed by these openings are essentially in a single plane. Diaphragms 28, 30, lens table 13 and screen 12 are so positioned that the diaphragms are in the object plane of the lens and the screen lies in its image plane. Thus the lens 54 inverts and projects the light images upon the screen 12. Movement of lens table 13 in the H and V directions move the optical axis of lens 54, which in turn positions the image projected upon screen 12 in proportion to such movement. Similar projection of the ship's position and predicted position image occurs when xenon lamp 24 is impulsed, the illumination in this instance being momentary and of far greater intensity.

Incandescent lamps 22 are selected to produce a relatively low level of intensity such that the image projected on screen 12 by these lamps is of sufficiently short persistence to appear to the human eye as an image 78 which instantaneously moves in response to the movements of pinions 44, 50, 56 and 60. In this connection it has been found preferable to operate the filaments of lamp bulb 22 at a slightly lower than normal operating voltage so that the illumination emitted by it is somewhat "redder" than usual for normal illumination purposes in order to eliminate a trace. This adjustment is made by presetting the tap on resistor 68. When keying arrangement 74 is closed and lamp 24 is flashed, the image pattern of light formed by the diaphragms momentarily becomes many times more intense than that produced by the incandescent lamps alone and an image (which is shown in different position from image 78 as though key 76 were closed at some earlier time) is projected or "printed" on screen 12 that persists for a relatively long period of time, as determined by selection of lamp 24 and coating 16. This persistent image will appear stationary on the plot marking the image position as it existed at the discrete moment that key 76 was closed.

FIG. 6 shows a specific use of plotting apparatus 10a in a multichannel plotter 82 for displaying more than one moving image. A lens table 13a and lamp and diaphragm assembly 14a are mounted to a transverse wall 83 within a housing 84. A phosphorescent screen 12a is supported in a window formed at the front end of housing 84. One or more other projectors 10b may be similarly mounted to the transverse wall 83, with the position of their respective projecting lenses positioned to compensate for the parallax.

Obviously many modifications and variations of the present invention are possible in the light of the above teachings. It is therefore to be understood that within the scope of the appended claims the invention may be practiced otherwise than as specifically described.

What is claimed is:
1. Projector and phosphorescent screen type plotting apparatus for simultaneously displaying a moving pictorial representation of plot data and a stationary representation of the plot data as it exists at a discrete moment of time, comprising;
   (a) a viewing screen coated with a material having phosphorescent properties,
   (b) first and
      second adjacent sources of phosphorescence producing radiant energy,
   (c) means cooperating with said sources and said view screen and disposed therebetween to produce a pictorial representation of plot data upon the screen and to selectively move said pictorial representation between various positions of said viewing screen,
   (d) said first source being adapted to produce continuous radiant energy to thereby project the moving display of the plot data upon the viewing screen,
   (e) said second source being selectively energizable to produce an impulse of radiant energy having sufficient intensity to activate the coating on the viewing screen to phosphoresce for a predetermined interval of time to thereby project said stationary pictorial representation on the screen.
2. Plotting apparatus in accordance with claim 1,
   (f) said second source including an ionizable gas which emits said radiant energy upon ionization, and
   (g) means for applying an impulse of electric field potential to said gas to ionize same.
3. Plotting apparatus in accordance with claim 2,
   (h) wherein said gas is xenon,
4. Plotting apparatus in accordance with claim 2,
   (i) said first source comprising an incandescent lamp.
5. Plotting apparatus in accordance with claim 1,
   said means cooperating with said source including
   (j) opaque means forming aperture means having a predetermined shape, and
      said sources each being adapted to provide scattered radiant energy, whereby said radiant energy passing through said aperture means forms a plot data image having said shape.

6. Plotting apparatus in accordance with claim 5, said means cooperating with said sources further including,
(k) a projection lens disposed between said opaque means and the viewing screen,
said aperture means being disposed at the focus of said projection lens.

7. Plotting apparatus in accordance with claim 6,
(l) said projection lens and opaque means being selectively movable relative to each other in such manner to effect movement of the image upon the screen as desired.

No references cited.

RALPH G. NILSON, *Primary Examiner.*